United States Patent [19]

Stanton

[11] 4,206,880
[45] Jun. 10, 1980

[54] FOOD PROCESSING APPARATUS

[75] Inventor: Graham B. Stanton, Palmerston North, New Zealand

[73] Assignee: Mauri Brother & Thomson (N.Z.) Limited, Auckland, New Zealand

[21] Appl. No.: 908,686

[22] Filed: May 23, 1978

[51] Int. Cl.² .............................................. B01F F/32
[52] U.S. Cl. ...................................... 241/98; 99/462; 241/101.1; 366/297; 366/325
[58] Field of Search ........................ 99/348, 460–466, 99/458, 459, 456; 366/96–99, 103, 104, 241–244, 261, 279, 280, 285, 292, 297; 241/98, 101.1

[56] References Cited
U.S. PATENT DOCUMENTS

| 3,193,929 | 7/1965 | Collins | 99/461 |
| 3,858,855 | 1/1975 | Hazen | 99/462 X |

FOREIGN PATENT DOCUMENTS

| 1312501 | 11/1962 | France | 99/461 |
| 116667 | 6/1946 | Sweden | 99/463 |

Primary Examiner—Billy J. Wilhite
Attorney, Agent, or Firm—Holman & Stern

[57] ABSTRACT

A closed food processing vat particularly for use as a cheese curd vat where at least one rotatable vertical shaft within the vat has a pivotally associated cutter frame stopped so the frame when the shaft is rotated in one direction is moved to a cutting position extending as a radius from the shaft with the cutting edge of the blades in the frame leading to a stirring position when the shaft is rotated in the opposite direction with the frame automatically moved as a reaction against the product in the vat to a position at an angle to the radius so that the projection of blades in the frame relative to the direction of rotation is increased to stir the product.

The present invention relates to food processing apparatus which has been particularly although not solely designed for use in cheese making.

10 Claims, 5 Drawing Figures

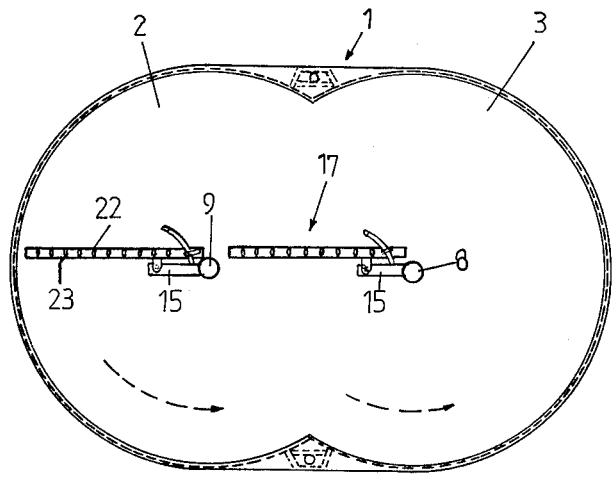
FIG 2
FIG 3
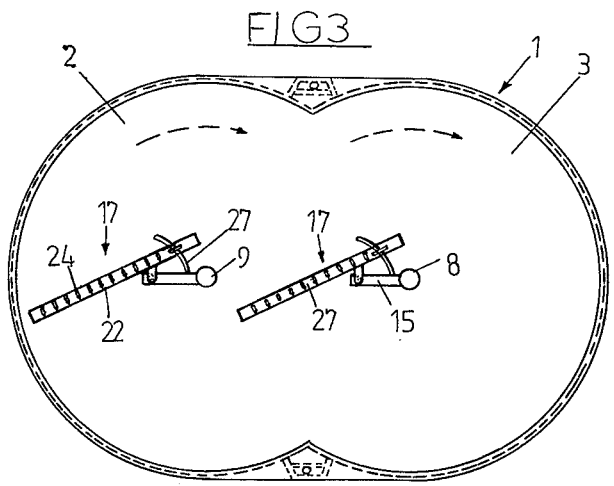
FIG. 5
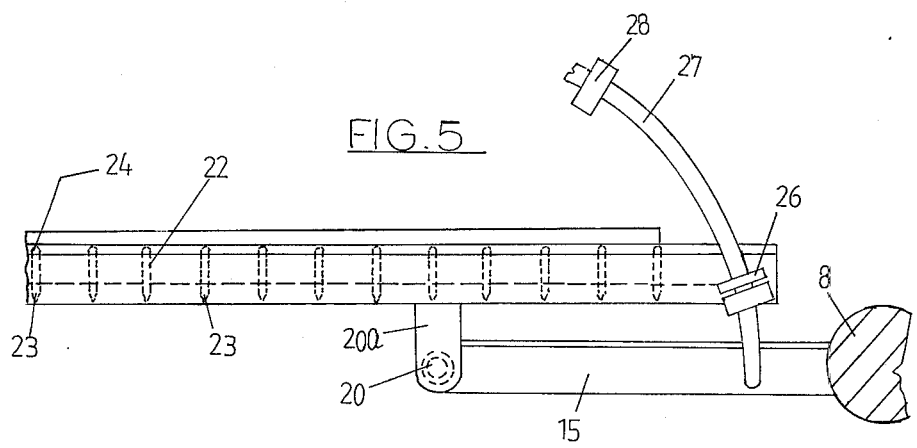

FOOD PROCESSING APPARATUS

BACKGROUND TO THE INVENTION

Modern cheese making techniques require a high level of cleanliness to be maintained and this is facilitated by a sealed or totally enclosed cheese vat. In such a vat it is necessary to provide means which will cut the curd once it has been set and will arrange for the curd to be stirred while being "cooked". A typical vat of this more modern type is described and claimed in New Zealand Pat. No. 172,299. Different forces require to be generated during the cutting and stirring cycles. Preferably, this should be achieved simply and in a manner which will allow for some adjustment.

SUMMARY OF THE INVENTION

Accordingly the invention consists in food processing apparatus comprising a vat, at least one rotatable vertical shaft disposed within said vat, drive means operable to rotate the shaft in either direction, frame support means projecting from said shaft, a cutter/stirrer frame with a plurality of blades incorporated therein, said cutter/stirrer frame being pivotally mounted on said frame support means to move between two positions, with the pivotal axis parallel to said shaft and parallel to the blades in said cutter/stirrer frame, the first of the said two positions being assumed when the shaft is rotated in one direction with the cutter/stirrer frame extending as a radius from the shaft and the cutter blades acting as knives projecting a minimum cutting edge to the product in the vat, and the second of the two positions being assumed when the shaft is rotated in the opposite direction with the cutter/stirrer frame located at an angle to the radius so that the projection of the blades in the cutter/stirrer frame relative to the direction of rotation is increased to stir the product.

More particularly the invention may be said to consist in food processing apparatus comprising a vat with vertical walls defining two communicating partially cylindrical chambers of an open figure eight configuration, a double coned top closing said vat, a sub frame mounted above said coned top, a rotatably mounted vertical shaft centrally located in each interconnecting chamber of the vat the upper end of each shaft being supported in said sub frame and drivably connected to the said drive means, a cutter/stirrer frame supported from each shaft to extend from adjacent the shaft to adjacent the walls of said vat with an area of intersection through which both frames pass, each frame having a plurality of vertical blades with the axis of the blades at right angles to the main plane of the frame, a pivotal mounting between the shaft and its associated frame with the axis of said pivotal mounting parallel to the shaft and located at a distance of less than half the width of the frame from the shaft, stop means to control the position of the frame relative to the shaft so that when the shaft rotates in one direction the frame will extend substantially as a radius from said shaft with the cutting edge of the blades in the frame leading and when the shaft rotates in the opposite direction the cutter/stirrer frame is moved by reaction against the contents of the vat to a second position at an angle to the radius so that the projection of the blades in the cutter/stirrer frame relative to the direction of rotation is increased to stir the product.

DESCRIPTION OF THE DRAWINGS

One preferred form of the invention will now be described with reference to the accompanying drawings in which:

FIG. 2 is a diagrammatic plan view of the cheese vat according to the present invention shown in the cutting mode of operation, FIG. 3 is a view similar to FIG. 2 but showing the stirring mode of operation, FIG. 4 is an elevation showing the cutter/stirrer frame in relationship to the rotating shaft in more detail and FIG. 5 is a partly diagrammatic plan view of the cutter/stirrer frame shown in FIG. 4.

DESCRIPTION OF THE PREFERRED EMBODIMENT

Figure 1:
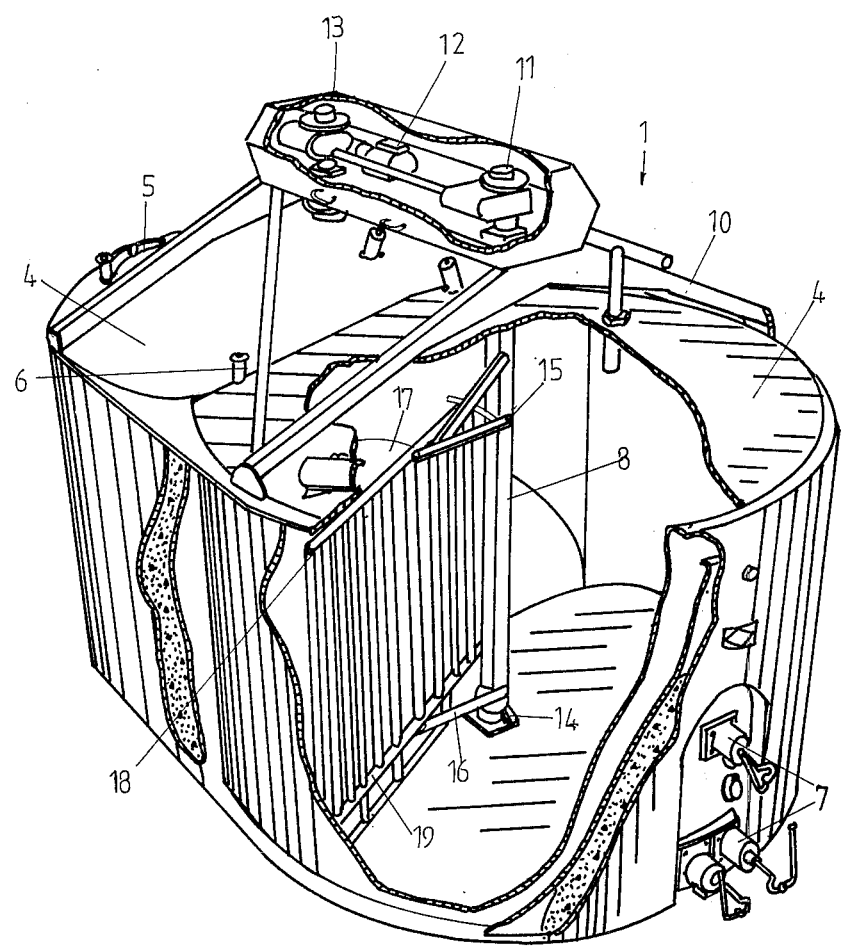
FIG. 1 is a pictorial and partly broken away view showing a cheese vat according to the present invention.

The preferred form of the invention is used as a cheese making vat but it will be appreciated that the invention would have application in a broader area of food processing technology where it was necessary to both cut and stir the contents in the vat.

The cheese vat 1 comprises a base frame which use a pair of intersecting cylindrical vertical wall sections to define an interior of an open FIG. 8 configuration with chambers 2 and 3. The vat is closed with a double coned top 4 through which an access hatch 5 is provided. The vat is normally sealed and milk is delivered thereto through a milk inlet 6. A bank of valves 7 are located in the walls to remove the contents from the vat during the various stages of processing.

Details of cheese processing will be well known to experts in the art and are not described in detail herein. The milk once introduced into the vat is set as a curd, the curd is cut and then stirred during "cooking" or heating. The present invention is primarily concerned with the cutting and stirring device incorporated in the vat.

Vertical shafts 8 and 9 are centrally located in the chambers 2 and 3. The shafts are carried at their upper end by a frame 10 mounted above the top 4. The frame 10 also supports the drive mechanism 11 having a motor 12 and necessary transmission and interconnecting drives which will allow the shafts 8 and 9 to be driven in synchronism in either direction. The drive is transmitted from a two speed three phase electric motor via multiple V-pulleys and two heavy duty reduction units which are hydrostatically sealed to prevent escape of lubricants into the vat. It would be possible to incorporate a variable speed drive if this was a customer requirement and this may be directly coupled to the motor. The sub-frame 10 is a stainless steel sub-frame and the drive unit is totally contained within a stainless steel cover 13.

The lower end of each shaft 8 and 9 is supported in a suitable bearing 14.

Each shaft 8 and 9 has extending therefrom frame support means provided by spaced apart arms 15 and 16 projecting normally from the shaft. The top arm 15 is braced back to the shaft and pivotal connections are provided at the end of each arm to allow the cutter/stirrer frame 17 to be pivotally supported.

Figure 4:
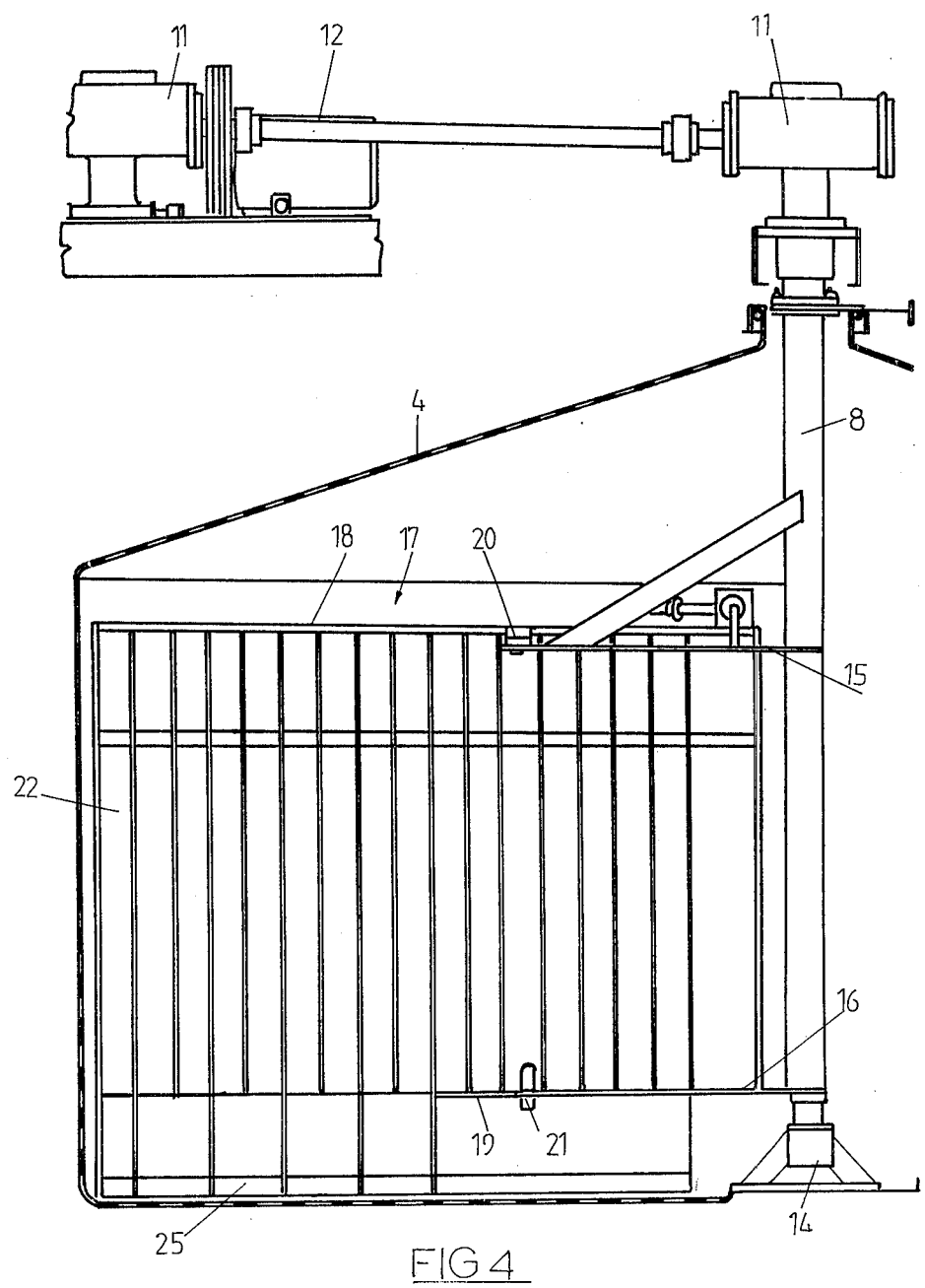

The cutter/stirrer frame 17 (illustrated in more detail in FIGS. 4 and 5) has a top transverse member 18 and a lower transverse member 19.

A plurality of vertical blades 22 extend between the transverse members. The vertical blades have a sharpened forward edge 23 and a rounded rear edge 24. As with the remainder of the vat the whole assembly is stainless steel.

A bottom transverse member 25 is positioned below the transverse member 19 and a number of the blades 22 extend down to the bottom transverse member. The bottom transverse member has a width such as to generate a stirring action close to the bottom of the vat during rotation.

A pivotal connection 20 is provided between the arm 15 and a hinge lug 20a projecting from the top transverse member. A similar pivotal connection 21 is provided between the arms 16 and the lower transverse member 19. The pivotal connections 20 and 21 provide a pivotal axis parallel to the shaft and are located along the transverse members at a point less than half the width of the frame.

The thus pivotally supported frame is confined to move between two positions.

In one position the cutter will assume a radius extending out from the shaft having the inner edge adjacent the shaft and the outer edge adjacent the wall of the vat. As the part of the cutter frame extending beyond the pivot points 20 and 21 is greater than that between the pivot points and the shaft the force generated on this outer part when the frame is moved through a substance in the vat may be used to change the position of the food.

The frame 17 is pivotally movable between two stopped positions. A guide lug 26 with an aperture therethrough extends from the top of the cutter/stirrer frame. A quadrant rod 27 extends from the top of the arm 15 and passes through the aperture in the guide leg 26. Stops on the quadrant tube 27 against which the lug engages to control the position of the frame.

The operating mode of the invention is depicted diagrammatically in FIGS. 2 and 3. In the first or cutting mode, (as shown in FIG. 2) the frames 17 are caused to move to a position where they extend as a radius from the shafts 8 and 9 and have the cutting edge 23 leading to cut the curd. The blades 22 at this position will project a minimum area relative to the direction of rotation and a clean cutting action will be achieved. As stated above the resistance generated by movement through the curd will automatically cause the frames to move to the position as illustrated in FIG. 2 when rotated counter-clockwise. There is an area of intersection where the curd is cut by both frames. Also movement of the frames tends to advance the curd so that eventually it is all caused to move through the area of intersection. The frames in their cutting mode are able to produce an evenly cut curd.

When the shafts 8 and 9 are rotated in the opposite direction, i.e. clockwise, the cutter/stirrer frames 17 move to the stirring position, as shown in FIG. 3. The resistance to movement of the frame through the curd rotates the frame about the pivots 20 and 21 until the stop on the quadrant tube 27 is engaged. The frames are now arranged at an angle to the radius. This means a projection of the area of the members of the frame and particularly the blades produce a rolling stirring action to within the vat. The stop 28 along the quadrant 27 is preferably adjustable to control the position of the frame in the stirring mode and this allows a means to regulate the stirring action.

The stirring action can take place during the part of the process when heat is being applied to "cook" or harden the curd. The heat is applied during the cooking cycle by a controlled falling film of hot water passing down over the outer wall of the vat. This film of water passes down through an insulated water jacket and is controlled so that the surface temperature does not exceed 60° C. This effectively avoids "burn on" problems. Because of the controlled cooking temperature and the complete and complex agitation caused by the stirring mechanism according to the present invention each curd particle is gently and properly cooked.

What I claim is:

1. Food processing apparatus comprising a vat, at least one rotatable vertical shaft disposed within said vat, drive means operable to rotate the shaft in either direction, frame support means projecting from said shaft, a cutter/stirrer frame with a plurality of blades incorporated therein, means pivotally mounting said cutter/stirrer frame on said frame support means at a point less than half the width of the cutter/stirrer frame from said shaft and means for restricting pivotal movement of said cutter/stirrer frame relative to said frame support means between a first extreme position in which said cutter/stirrer frame extends substantially as a radius from said shaft and a second extreme position in which said cutter/stirrer frame is located at an angle to said radius, said extreme positions of said cutter/stirrer frame being assumed when said shaft is rotated in opposite directions respectively.

2. Apparatus as claimed in claim 1 wherein the cutter/stirrer frame has transverse members supporting a plurality of parallel vertical cutting blades with the cutter/stirrer frame being of a size such as to pass through a substantial portion of the product located in the part of the vat associated with the shaft.

3. Apparatus as claimed in claim 2 wherein the cutter/stirrer frame is supported by the frame support means so that when the shaft rotates, the force generated by contact between the cutter/stirrer frame and the product will cause the frame to move to the desired position.

4. Apparatus as claimed in claim 1 wherein the angle at which the cutter/stirrer frame can be moved relative to the radius is adjustable thereby providing a means of regulating the stirring action.

5. Apparatus as claimed in claim 1 wherein said vat comprises a base from which are supported a pair of intersecting vertical wall sections which together define two communicating partially cylindrical chambers of an interior open figure eight configuration and a double coned top completely closing the vat with a sub-frame mounted above the coned top to support the upper end of the vertical shafts centrally located in each partially cylindrical section of the vat and the drive means for the shafts.

6. Apparatus as claimed in claim 5 wherein the cutter/stirrer frames have a common area through which they move to cut and stir the product in the vat.

7. Apparatus as claimed in claim 1 wherein said frame support means projecting from said shaft comprise two spaced apart arms extended normally from said shaft, said mounting means comprising a pivotal connection between the outer part of the arms and the cutter/stirrer frame to form a pivotal axis parallel to the shaft and said restricting means comprises stop means carried by said frame support means to control the position of the cutter/stirrer frame so that upon rotation of said shaft in one rotational direction, the cutter/stirrer frame will form a radius projecting from the shaft and in the other direction of rotation said cutter/stirrer frame will more to an angle to the radius from said shaft.

8. Apparatus as claimed in claim 1 wherein said cutter/stirrer frame comprises a top transverse member, a lower transverse member, a plurality of vertical blades disposed between said members with said frame being pivotally supported at or adjacent the transverse member and at said point less than half the width of the cutter/stirrer frame from the associated shaft.

9. Apparatus as claimed in claim 8 wherein said frame includes a bottom transverse member arranged in use to rotate adjacent the bottom of the vat and having a cross-section sufficient to generate a stirring action adjacent the bottom and a plurality of vertical blades extending between the lower transverse member and said bottom member.

10. Food processing apparatus comprising a vat with vertical walls defining two communicating partially cylindrical chambers of an open figure eight configuration, a double coned top closing said vat, a sub frame mounted above said coned top, a rotatably mounted vertical shaft centrally located in each interconnecting chamber of the vat the upper end of each shaft being supported in said sub frame and drivably connected to the said drive means, a cutter/stirrer frame supported from each shaft to extend from adjacent the shaft to adjacent the walls of said vat with an area of intersection through which both frames pass, each frame having a plurality of vertical blades with the axis of the blades at right angles to the main plane of the frame, a pivotal mounting between the shaft and its associated frame with the axis of said pivotal mounting parallel to the shaft and located at a distance of less than half the width of the frame from the shaft, stop means to control the position of the frame relative to the shaft so that when the shaft rotates in one direction the frame will extend substantially as a radius from said shaft with the cutting edge of the blades in the frame leading and when the shaft rotates in the opposite direction the cutter/stirrer frame is moved by reaction against the contents of the vat to a second position at an angle to the radius so that the projection of the blades in the cutter/stirrer frame relative to the direction of rotation is increased to stir the product.

* * * * *